(12) United States Patent
Kim et al.

(10) Patent No.: US 6,480,546 B1
(45) Date of Patent: Nov. 12, 2002

(54) ERROR CONCEALMENT METHOD IN A MOTION VIDEO DECOMPRESSION SYSTEM

(75) Inventors: Eung-Tae Kim, Seoul; Hee-Bok Park, Kyonggi-do; Jae-Won Suh, Kyonggi-do; Yo-Sung Ho, Kyonggi-do, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/320,681

(22) Filed: May 27, 1999

(30) Foreign Application Priority Data

May 28, 1998 (KR) .............................. 98-19400

(51) Int. Cl.[7] .................... G06F 11/00; H04L 1/00
(52) U.S. Cl. ................... 375/240.27; 714/747
(58) Field of Search ............... 375/240.27; 714/747; H04N 7/36, 7/50

(56) References Cited

U.S. PATENT DOCUMENTS

| 5,243,428 A | * | 9/1993 | Challapali et al. | .......... 714/747 |
| 5,455,629 A | * | 10/1995 | Sun et al. | .............. 375/240.27 |
| 5,737,023 A | * | 4/1998 | Linzer | ................... 375/240.15 |
| 6,285,715 B1 | * | 9/2001 | Ozcelik et al. | ........ 375/240.27 |

* cited by examiner

*Primary Examiner*—Howard Britton
(74) *Attorney, Agent, or Firm*—Birch, Stewart, Kolasch & Birch, LLP

(57) ABSTRACT

An error concealment method of a motion video decompression system is disclosed. The present invention uses motion vector estimation to recover video signals, with errors generated by a transmission state, nearly to the original video. Particularly, the present method includes estimating motion information of a lost video, and restoring the lost video from a video adjacent to the lost video by using the estimated motion information.

20 Claims, 5 Drawing Sheets

Top Macroblock

| | | For. (F1) | Back (B1) | Inter (F1,B1) | Intra |
|---|---|---|---|---|---|
| Bottom Macroblock | For. (F2) | (F1+F2)/2 | (B1+F2)/2 | (F1+F2)/2 | F2 |
| | Back. (B2) | (F1+B2)/2 | (B1+B2)/2 | (B1+B2)/2 | B2 |
| | Inter (F2,B2) | (F1+F2)/2 | (B1+B2)/2 | (F1+F2)/2 | (F2+B2)/2 |
| | Intra | F1 | B1 | (F1+B1)/2 | |

Top Macroblock

|  |  | For.<br>(F1) | Back<br>(B1) | Inter<br>(F1,B1) | Intra |
|---|---|---|---|---|---|
| Bottom<br>Macroblock | For.<br>(F2) | (F1+F2)/2 | (B1+F2)/2 | (F1+F2)/2 | F2 |
| | Back.<br>(B2) | (F1+B2)/2 | (B1+B2)/2 | (B1+B2)/2 | B2 |
| | Inter<br>(F2,B2) | (F1+F2)/2 | (B1+B2)/2 | (F1+F2)/2 | (F2+B2)/2 |
| | Intra | F1 | B1 | (F1+B1)/2 |  |

FIG.5

Top Macroblock(C1)

| | For. (F1) | Back. (B1) | Inter (F1,B1) | Intra |
|---|---|---|---|---|
| For. (F2) | (P1+P2)/2 | (L1+P2)/2 | (P1+P2)/2 | P2 |
| Back. (B2) | (P1+L1)/2 | (L1+L2)/2 | (L1+L2)/2 | L2 |
| Inter (F2,B2) | (P1+P2)/2 | (L1+L2)/2 | (P1+P2)/2 | (P2+L2)/2 |
| Intra | P1 | L1 | (P1+L1)/2 | |

Bottom Macroblock (C2)

FIG.6

Top Macroblock(C1,C3)    B' frame

| | For. (F1) | Back. (B1) | Inter (F1,B1) | Inter (F1,B1) | Intra |
|---|---|---|---|---|---|
| For. (F2) | (F1+F2)/2 | (B1+F2)/2 | (F1+F2)/2 | (F1+F2)/2 | F2 |
| Back. (B2) | (F1+B2)/2 | (B1+B2)/2 | (B1+B2)/2 | (B1+B2)/2 | B2 |
| Inter (F2,B2) | (F1+F2)/2 | (B1+B2)/2 | (F1+F2)/2 | (B1+B2)/2 | (F2+B2)/2 |
| Inter (F2,B2) | (F1+F2)/2 | (B1+B2)/2 | (B1+B2)/2 | (B1+B2)/2 | (F2+B2)/2 |
| Intra | F1 | B1 | (F1+B1)/2 | (F1+B1)/2 | |

Bottom Macroblock (C2,C4)

B frame

|  | | Top Macroblock(C1,C3) | | | B' frame | |
|---|---|---|---|---|---|---|
|  |  | For. (F1) | Back (B1) | Inter (F1,B1) | Inter (F1,B1) | Intra |
| Bottom Macroblock (C2,C4) | For. (F2) | (P1+P2)/2 | (L1+P2)/2 | (P1+P2)/2 | (P1+P2)/2 | P2 |
|  | Back. (B2) | (P1+L1)/2 | (L1+L2)/2 | (L1+L2)/2 | (L1+L2)/2 | L2 |
|  | Inter (F2,B2) | (P1+P2)/2 | (L1+L2)/2 | (P1+P2)/2 | (L1+L2)/2 | (P2+L2)/2 |
| B frame | Inter (F2,B2) | (P1+P2)/2 | (L1+L2)/2 | (L1+L2)/2 | (L1+L2)/2 | (P2+L2)/2 |
|  | Intra | P1 | L1 | (P1+L1)/2 | (P1+L1)/2 |  |

ERROR CONCEALMENT METHOD IN A MOTION VIDEO DECOMPRESSION SYSTEM

BACKGROUND OF THE INVENTION

1. Field of the Invention

The present invention relates to a motion video decompression system and more particularly to error recovery in a motion video decompression system. The present invention utilizes motion vector estimation to recover video signals, with errors generated by the transmission state (nearly to the original video) thereby preventing damage due to the error.

2. Discussion of Related Art

With the rapid development of digital signal processing technology, greater amounts of motion video signals are compressed and transmitted through transmission channels of limited bandwidth. Thus, if an error occurs on the transmission channel during transmission of a motion video signal, the quality of recovered video would be lowered significantly. When an error occurs in the coded video data, the recovered video may be displayed in one of a variety of ways, depending upon the coding system utilized.

Particularly, under the standards of the Motion Picture Experts Group (MPEG), motion video is divided into 16×16 blocks, where each block is called a macroblock. A plurality of macroblocks makes a slice, and depending upon the video size, a plurality of slices makes one frame.

The MPEG system utilizes a transform coding method and a motion compensation coding method. In such system, if an error occurs in even one bit of a bit row, the continuous macroblocks corresponding to the bit row on which the error is generated are damaged and thus, a large range of video information is lost. The effects of the damaged and lost video data continues to the next several frames. As a result, decoding the bit streams which were transmitted utilizing the coding procedure described above may result in a severely deteriorated quality of video data.

Accordingly, various recovering methods have been developed in the related art by which lost information is compensated using the normally recovered information adjacent to the lost data, thereby restoring the lost video data nearly to the original video. Although an error correcting code can be used, the normally recovered data adjacent to the lost data is used in order to maximize the limited bandwidth of the transmission channel. FIG. 1 shows a frame of 16×16 macroblocks to illustrate a conventional error concealment method of a motion video decompression system in the related art.

Generally, the conventional error concealment method used in the digital TV is classified into a temporal predicted error concealment method and a spatial predicted error concealment method, according to the video information. The temporal predicted error concealment method utilizes the redundant information between two consecutive frames while the spatial predicted error concealment method utilizes a spatial redundancy in the frame in which the information is included.

More specifically, the temporal predicted error concealment method is executed based upon the sequential videos which have time-correlation with each other. As shown in FIG. 1, the lost video data of a macroblock E1 within a current frame CF is replaced by a macroblock E1' in the same position of a previous frame PF.

On the other hand, the spatial predicted error concealment method compensates the lost macroblock by using the macroblocks of the current frame which were not lost, rather than using the information of the previous frame. As shown in FIG. 1, the video data of a lost macroblock E1 is replaced with the data of any adjacent macroblock C1–C8 which were not lost.

However, the conventional error concealment methods as described above have several problems. First, in the conventional temporal predicted error concealment method, the motions of the lost macroblocks are not considered. When a large amount of the motion exists between two successive frames, even if the macroblock E1' of the previous frame PF is at the same position as the lost macroblock E1, the coded information would greatly differ from the original macroblock, resulting in a deterioration of the video quality.

Also, in the conventional spatial predicted error concealment method, when spatial correlation is reduced between the lost macroblock and the adjacent macroblocks, the video of the restored block may be significantly different from the original video, resulting in the deterioration of the video quality.

SUMMARY OF THE INVENTION

Accordingly, an object of the present invention is to solve at least the problems and disadvantages of the related art.

An object of the invention is to provide an error concealment method of a motion video decompression system with an improved video quality.

Specifically, the object of the invention is to provide an error concealment method of a motion video decompression system capable of estimating motion of a lost macroblock within a frame according to the type of input video by using the motion vector of macroblocks adjacent to the lost macroblock to restore the video in the lost macroblock to nearly the original video.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, an error concealment method of a motion video decompression system includes estimating the motion information of a lost video; and restoring the lost video from the video adjacent to the lost video by using the estimated motion information.

BRIEF DESCRIPTION OF THE ATTACHED DRAWINGS

The invention will be described in detail with reference to the following drawings in which like reference numerals refer to like elements wherein:

FIG. 5 illustrates a motion estimation method of a lost macroblock where one or more B frames are increased within a group of pictures according to a first embodiment of the present invention;

FIG. 6 is an example view of FIG. 5;

Figures 7, 8:
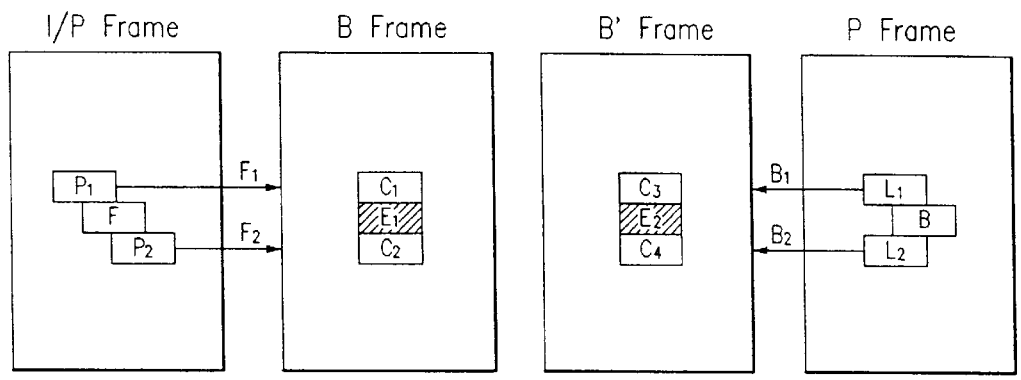

FIG. 7 llustrates a error concealment method of a lost macroblock by using the motion vectors of a top macroblock and a bottom macroblock of the lost macroblock to explain an error concealment method of a bidirectional predictive frame (B frame) in a motion video decompression system according to a second embodiment of the present invention; and FIG. 8 illustrates a error concealment method of a lost macroblock where one or more B frames are increased within a group of pictures according to a second embodiment of the present invention.

DETAILED DESCRIPTION OF PREFERRED EMBODIMENT

Reference will now be made in detail to the preferred embodiments of the present invention, examples of which are illustrated in the accompanying drawings.

Utilizing motion vector estimation, an error concealment method of a motion video decompression system according to the present invention estimates the motion information depending on the coding mode of video input. Namely, the coding mode may be an intra frame (I frame), a predictive frame (P frame), or a bidirectional predictive frame (B frame).

For I frames having only the intra mode, the information of the lost macroblock is recovered from the data of a macroblock positioned in the same location as the lost macroblock in a previous frame.

For P and B frames, which have motion vectors, the information of the lost macroblock is recovered by using the motion vector of the macroblocks adjacent to the lost macroblock. An explanation of an error concealment method by using the motion vector estimation according to the present invention will be separately discussed for the P and B frames.

Figure 1:
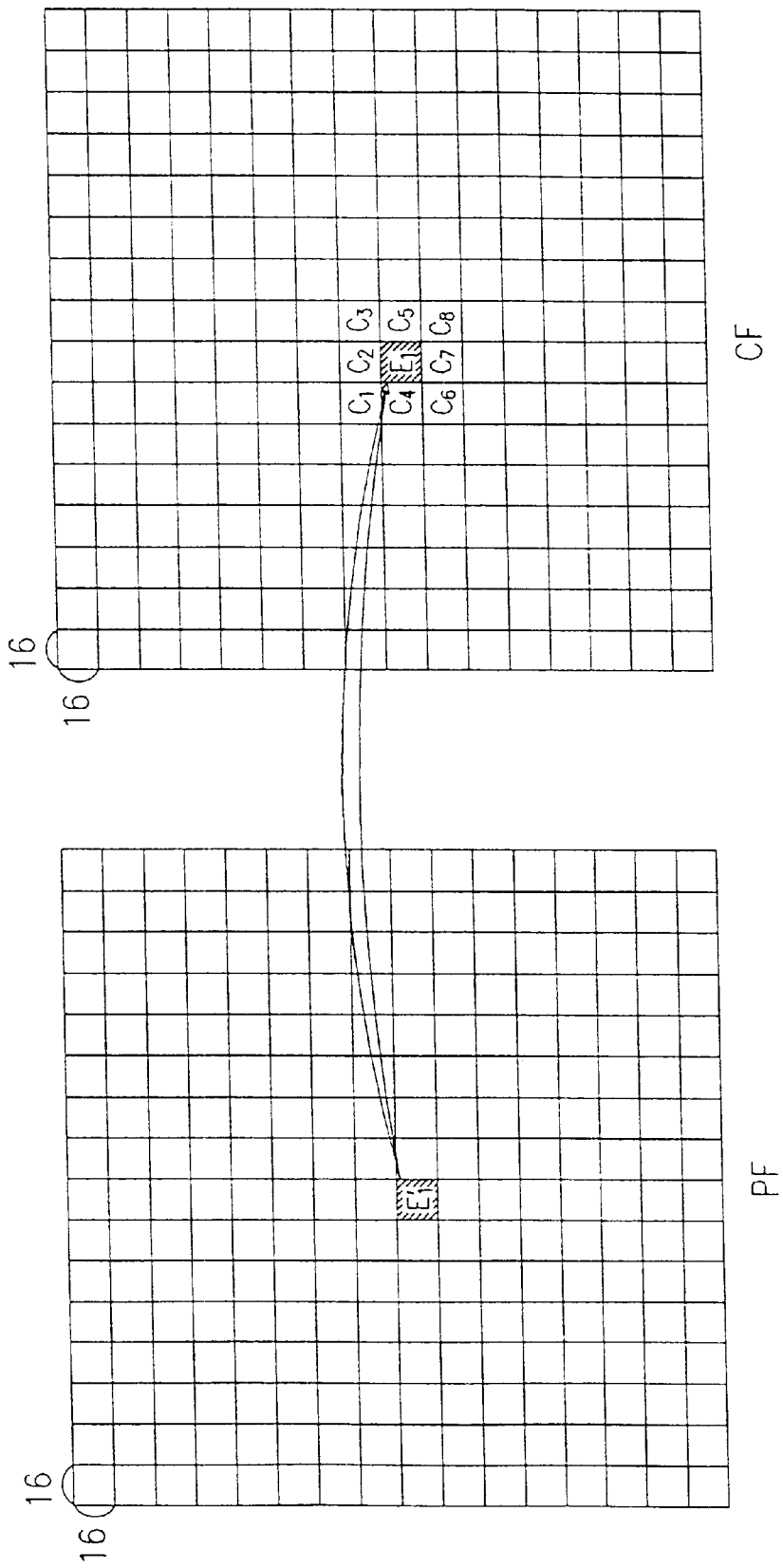
FIG. 1 is illustrates a conventional error concealment method of a motion video decompression system.
Figure 2:
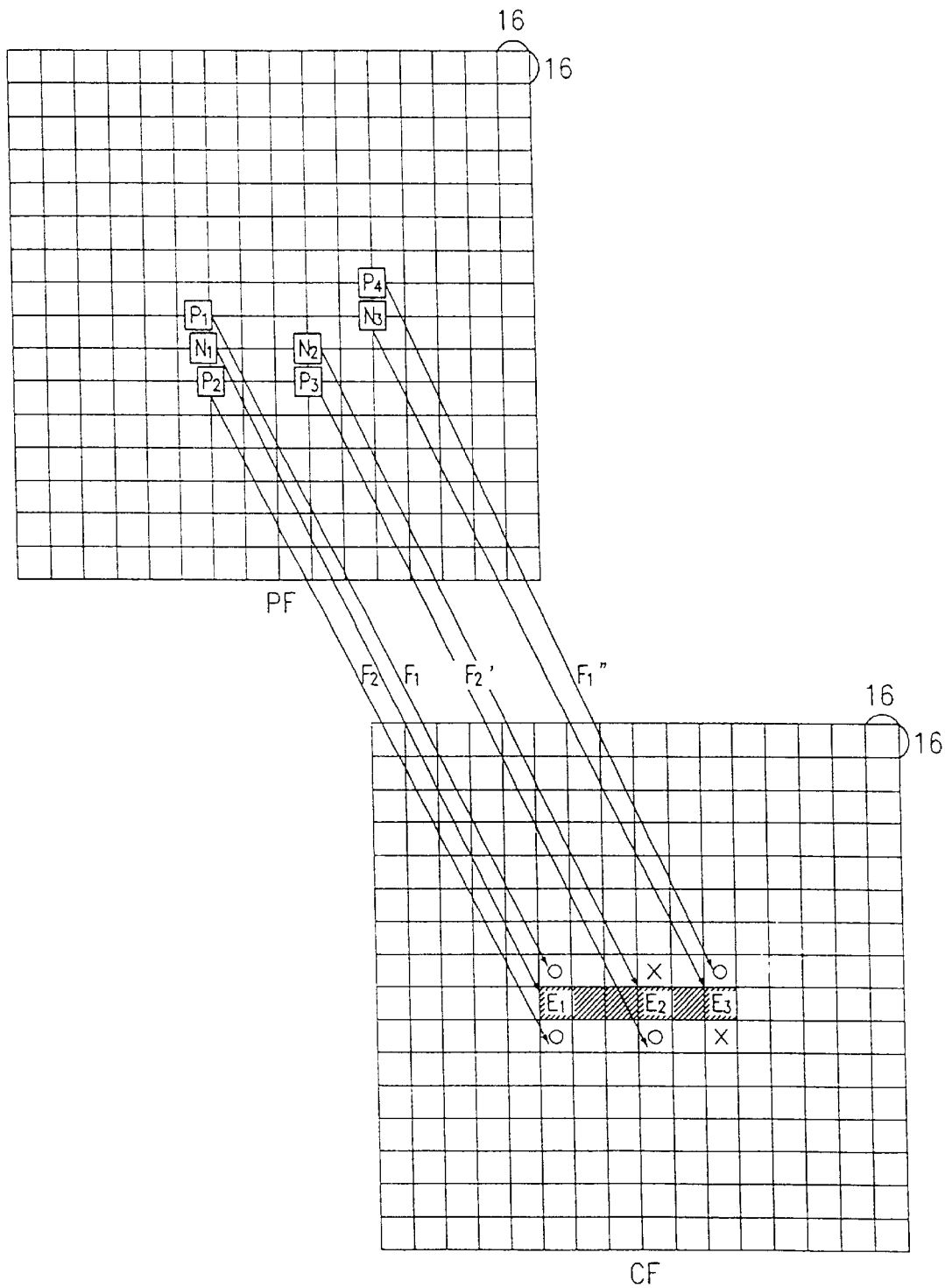
FIG. 2 illustrates an error concealment method of a motion video decompression system according to the present invention, wherein a motion vector estimation of a predictive frame(P frame) is embodied.

FIG. 2 illustrates an error concealment method of the present invention wherein the motion vector is estimated for the P frame. The coding mode in the P frame comprises a forward prediction mode where forward motion vector is utilized and an intra mode where a motion vector is not utilized. If a macroblock is lost in the P frame, one of two situations may arise. First, the top macroblock and the bottom macroblock of the lost macroblock would have a motion vector, respectively. Second, either the top macroblock or the bottom macroblock of the lost macroblock would have a motion vector.

If both the top macroblock and the bottom macroblock of the lost macroblock have the motion vector, respectively, the average motion vector value between the two motion vector values is obtained. The motion vector of the lost macroblock is then estimated by the obtained average value. If either the top or bottom macroblock of the lost macroblock has the motion vector, the motion vector of the lost macroblock is estimated by the motion vector value of the macroblock having the motion vector, as is.

Referring to FIG. 2, if macroblocks E1, E2 and E3 are lost within the P frame, a detection is made whether a motion vector exists on the top macroblocks and the bottom macroblocks of the lost macroblocks E1, E2 and E3. Because the lost macroblock E1 has motion vectors F1 and F2 on both the top and bottom macroblocks, respectively, the positions of macroblocks P1 and P2 of the previous frame PF can be obtained.

From the positions of macroblocks P1 and P2, the motion vector of the lost macroblock E1 can be estimated. In other words, the motion vector of the lost macroblock E1 is estimated by the average value [(F1+F2)/2] between the motion vector F1 and F2 of the top and bottom macroblocks thereof. On the other hand, the lost macroblock E2 has a motion vector F2' only in the bottom macroblock, and the lost macroblock E3 has a motion vector F1" only in the top macroblock. Thus, the motion vector of each of the lost macroblocks E2 and E3 is estimated by the motion vector values F2' and F1", respectively.

Thereafter, by using the estimated motion vectors, the positions of macroblocks N1, N2 and N3 of the previous frame PF can be obtained, and the data of the lost macroblocks E1, E2 and E3 are respectively recovered from the information of the macroblocks N1, N2 and N3. Particularly, macroblocks N1, N2 and N3 of the previous frame PF which are obtained using the estimated motion vectors replaces the data of the lost macroblocks E1, E2, and E3.

Figures 3, 4:
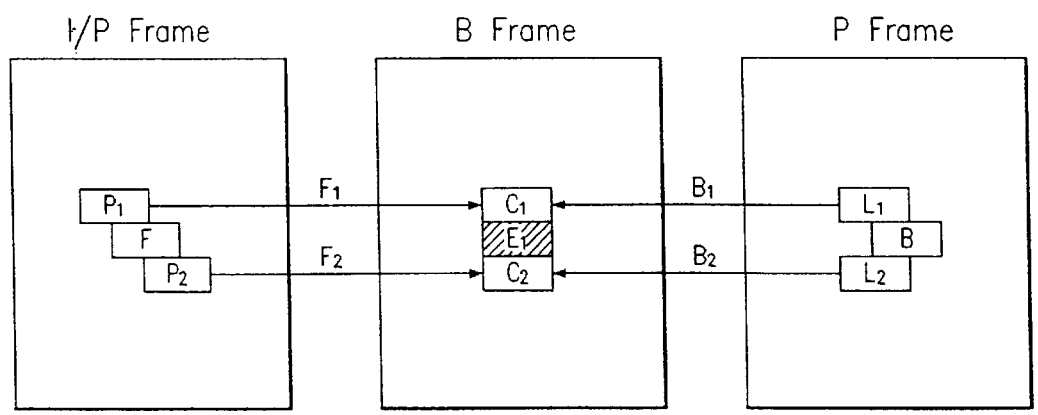
FIG. 3 illustrates a motion estimation method of a lost macroblock by using the motion vectors of a top macroblock and a bottom macroblock of the lost macroblock to explain an error concealment method of a bidirectional predictive frame (B frame) in a motion video decompression system according to a first embodiment of the present invention.
FIG. 4 is an example view of FIG. 3.

FIGS. 3 and 4 illustrate a motion estimation method of the present invention to recover a lost macroblock for the B frame in a motion video decompression system according to the present invention. The coding system of the B frame includes a forward motion vector (For.), a backward motion (Back.) vector and bidirectional motion vectors (Inter). Utilizing the motion vectors, the lost macroblocks may be efficiently recovered.

If a macroblock is lost in the B frame, the method for estimating the motion vector of the lost macroblock may be executed in various manners, shown in FIG. 3, as compared to the P frame. Depending upon whether the top and bottom macroblocks C1 and C2 of a lost macroblock E1 in the B frame have motion vectors, the motion vector for the lost macroblock E1 may be estimated in various ways.

Referring to both FIGS. 3 and 4, an inter mode is executed if at least one of the top or bottom macroblocks C1 and C2 have both forward and backward motion vectors, i.e. Inter (F1, B1) or Inter(F2, B2). A forward or backward mode is executed if either the forward motion vector, For.(F1) or For.(F2) or the backward motion vector, Back.(B1) or Back. (B2) exists. An intra mode is executed where both the forward and the backward motion vectors do not exist. According to each mode, the motion vector of the lost macroblock E1 is estimated by two methods explained below.

Generally, average values between the motion vectors of the top and bottom macroblocks C1 and C2 are calculated to estimate the motion vector of the lost macroblock E1, by which a corresponding macroblock of an appropriate frame is used to recover the lost macroblock E1. In the second method, a average values of the pixels are utilized rather than the motion vectors to recover the lost macroblock E1. Namely, an average value between pixels of a macroblock obtained using the motion vector of the top macroblock and pixels of a macroblock obtained using the motion vector of the bottom macroblock are utilized to recover the lost macroblock E1.

In the first method, when both the top and bottom macroblocks C1 and C2 have either one of a forward motion vectors' F1, F2 or backward motion vectors B1, B2, the average value between two motion vector values is obtained as the estimated motion vector of the lost macroblock E1. Three situations will be discussed as examples.

In the first example, if both the top and bottom macroblocks C1 and C2 have only the forward motion vectors F1 and F2, the average value [(F1+F2)/2] between the forward motion vector values of the top and bottom macroblocks C1 and C2 is calculated to estimate the motion vector of the lost macroblock E1. Utilizing the estimated motion vector, the lost macroblock E1 can be recovered from the macroblock of the previous frame.

In the second example, if both the top and bottom macroblocks C1 and C2 have only the backward motion vectors B1 and B2, the average value [(B1+B2)/2] between the backward motion vector values of the top and bottom macroblocks C1 and C2 is calculated to estimate the motion vector of the lost macroblock E1. Utilizing the estimated motion vector, the lost macroblock E1 can be recovered from the macroblock of the subsequent frame.

In the third example, if the top macroblock C1 has the forward motion vector F1 and the bottom macroblock C2 has the backward motion vector B2 or if the top macroblock C1 has the backward motion vector B1 and the bottom macroblock C2 has the forward motion vector F2, the average value [(F1+B2)/2 or (F2+B1)/2] between the forward and backward motion vector values of the top and bottom macroblocks C1 and C2 is calculated to estimate the motion vector of the lost macroblock E1. The lost macroblock E1 can then be recovered from the macroblock within the previous frame or the subsequent frame. In the preferred embodiment, the recovery of the lost macroblock should be made from the macroblock within the previous frame.

When either one of the top or bottom macroblock C1 or C2 has an inter mode with both the forward and backward motion vectors while the other macroblock has one of either a forward or backward motion vector, the average value between the forward motion vectors or the average value between backward motion vectors are obtained to estimate the motion vector of the lost macroblock E1.

For example, if the top macroblock C1 has the inter mode with both forward and backward motion vectors F1 and B1 while the bottom macroblock C2 has the backward motion vector B2, the motion vector of the lost macroblock E1 is estimated by the average value [(B1+B2)/2] between the backward motion vector values. On the other hand, if the top macroblock C1 has the inter mode while the bottom macroblock C2 has the forward motion vector F2, the motion vector of the lost macroblock E1 is estimated by the average value [(F1+F2)/2] between the forward motion vector values. By using motion vector values of the same frame, the motion vector of the lost macroblock can be best estimated, thereby better approximating the data of the lost macroblock.

If both the top and bottom macroblocks C1 and C2 have the inter mode, the average value [(F1+F2)/2] between the forward motion vector values is calculated to estimate the motion vector of the lost macroblock E1. Although the backward motion vector values may be utilized, in the preferred embodiment, the forward motion vector values are utilized because information of the previous frame generally better approximates the data of the lost macroblock E.

If one of either the top or bottom macroblock C1 or C2 has an intra mode with no forward or backward motion vector, while the other macroblock has one of either a forward motion vector or a backward motion vector, the forward motion vector (F1 or F2) or the backward motion vector (B1 or B2) of the macroblock not in the intra mode is utilized to estimate the motion vector of the lost macroblock E1.

If one of either the top or bottom macroblock C1 or C2 has the intra mode and the other macroblock has the inter mode, the average value [(F1+B1)/2 or (F2+B2)/2] between the forward and backward motion vector values of the macroblock in the inter mode is calculated to estimate the motion vector of the lost macroblock E1. By using the estimated motion vector, the position of the appropriate macroblock F or B of the corresponding frame can be obtained, as discussed above. Accordingly, the information of the macroblock F or B replaces the data of the lost macroblock E1. However, if both the top and bottom macroblocks C1 and C2 have the intra mode, the data of the lost macroblock is simply recovered from the information of the macroblock positioned at the same location within the previous frame, as in the conventional art.

Alternatively, in the second method, average values of the pixels are utilized to recover the lost macroblock E1. FIG. 5 shows average values of pixels obtained utilizing the motion vectors existing on a top and a bottom macroblock of the lost macroblock to explain an error concealment method of a bidirectional predictive frame (B frame) in a motion video decompression system. Referring to FIG. 4, utilizing the pixels of the macroblock P1 or L1 corresponding to motion vector of the top macroblock C1 and utilizing the pixels of the macroblock P2 or L2 corresponding to motion vector of the bottom macroblock C2, the lost macroblock E1 is concealed.

When both the top and bottom macroblocks C1 and C2 have either one of a forward motion vectors F1, F2 or backward motion vectors B1, B2, the average value between the pixels of macroblocks corresponding to the two motion vector replaces the lost macroblock E1. Three situations will be discussed as examples.

In the first example, if both the top and bottom macroblocks C1 and C2 have only the forward motion vectors F1 and F2, the average value [(P1+P2)/2] between the pixels of macroblocks corresponding to the forward motion vector values of the top and bottom macroblocks C1 and C2 is calculated to replace and recover the lost macroblock E1.

In the second example, if both the top and bottom macroblocks C1 and C2 have only the backward motion vectors B1 and B2, the average value [(L1+L2)/2] between the pixels of macroblocks corresponding to the backward motion vector values of the top and bottom macroblocks C1 and C2 is calculated to replace and recover the lost macroblock E1.

In the third example, if the top macroblock C1 has the forward motion vector F1 and the bottom macroblock C2 has the backward motion vectors B2 or if the top macroblock C1 has the backward motion vector B1 and the bottom macroblock C2 has the forward motion vectors F2, the average value [(Pl+L2)/2 or (P2+L1)/2] between the pixels of macroblocks corresponding to the forward and backward motion vector values of the top and bottom macroblocks C1 and C2 is calculated to replace and recover the lost macroblock E1.

When either one of the top or bottom macroblock C1 or C2 has an inter mode with both the forward and backward motion vectors while the other macroblock has one of either a forward or backward motion vector, the average value between the pixels of macroblocks corresponding to the forward and/or backward motion vector values replaces the lost macroblock E1.

For example, if the top macroblock C1 has the inter mode with both forward and backward motion vectors F1 and B1 while the bottom macroblock C2 has the backward motion vector B2, the average pixel value is obtained by macroblocks corresponding to the backward motion vector values, i.e. [(L1+L2)/2]. On the other hand, if the top macroblock C1 has the inter mode while the bottom macroblock C2 has the forward motion vector F2, the average pixel value is obtained by macroblocks corresponding to the forward motion vector values, i.e. [(Pl+P2)/2]. By using motion vector values of the same frame, the pixels of the lost macroblock can be best estimated, thereby better approximating the data of the lost macroblock.

If both the top and bottom macroblocks C1 and C2 have the inter mode, the average value [(Pl+P2)/2] of the pixels of macrocblocks corresponding to the forward motion vector values is calculated to replace and recover the lost macroblock E1. Although the backward motion vector values may be utilized, in the preferred embodiment, the forward motion vector values are utilized because information of the previous frame generally better approximates the data of the lost macroblock E.

If one of either the top or bottom macroblock C1 or C2 has an intra mode with no forward or backward motion vector, while the other macroblock has one of either a forward motion vector or a backward motion vector, the pixels of macroblocks corresponding to the forward motion vector (F1 or F2) or the backward motion vector (B1 or B2) of the macroblock not in the intra mode is utilized to replace and recover the lost macroblock E1.

If one of either the top or bottom macroblock C1 or C2 has the intra mode and the other macroblock has the inter mode, the average value [(P1+L1)/2 or (P2+L2)/2] of pixels of macroblocks corresponding to the forward and backward motion vector values of the macroblock in the inter mode is calculated to replace and recover the lost macroblock E1. If both the top and bottom macroblocks C1 and C2 have the intra mode, the data of the lost macroblock is simply recovered from the information of the macroblock positioned at the same location within the previous frame, as in the conventional art.

FIG. 6 illustrates a motion estimation method of a lost macroblock, where one or more B frames are added within the GOP, and FIG. 7 is an example view of FIG. 6. While FIG. 4 shows a frame arrangement order of {I,B,P,B,P . . . }, FIG. 7 shows a frame arrangement order of {I,B,B,P,B, B,P . . . } in which one or more B frame are added. Particularly, if at least two frames are interposed between an I frame and P frame or between two P frames, the motion estimation method of the lost macroblock may be varied, as shown in FIG. 6.

Generally, B' frames add a second inter mode and since the first B frame is adjacent to a previous I or P frame while the second B' frame is adjacent to the subsequent P frame, variable adaptation of the forward and backward motion vector values allows an efficient recovery of the data of the lost macroblocks E1 and E2. The estimation method of a lost macroblock, where one or more B frames are added will be explained with reference to FIGS. 5 and 6.

When both the top macroblocks C1 and C3 and bottom macroblocks C2 and C4 are in the inter mode, the information of the previous frame is given greater weight for the B frame such that the average value [(F1+F2)/2] between the forward motion vector values is calculated to estimate the motion vector pf the lost macroblock E1. On the other hand, the information of the subsequent frame is given greater weight for the B' frame such that the average value [(B1+ B2)/2] between the backward motion vector values is calculated to estimate the motion vector of the lost macroblock E2.

Similarly, if there are more than two B frames between an I frame and P frame or between two P frames, the amount of weight given to the motion vector values from the previous frame and the subsequent frame depends upon the distance of the B frame from the previous frame and the subsequent frame. Namely, the closer the B frame is to a previous or subsequent frame with the motion vector, the greater the weight of the information of the previous or subsequent frame. For example, if a macroblock is lost in the B' frame in a frame order of {I,B,B',B,B,B,P . . . }, the motion vectors from the I frame would be given greater weight in the estimation of the motion vector for the lost macroblock.

If a B frame is equidistant to both the previous frame and the subsequent frame, the motion vectors from either one of the previous frame or the subsequent frame may be used to estimated the motion vector for the lost macroblock. However, in the preferred embodiment, the motion vectors from the previous frame is utilized. For example, if a macroblock is lost in the B' frame in a frame order of {I,B,B',B,P . . . }, the I frame would be given greater weight in the estimation of the motion vector for the lost macroblock.

Similar to recovering the lost macroblock using average values of motion vectors, average values of pixel values can be utilized to recover the lost macroblock where one or more B frames are added within the GOP, as shown in FIG. 8. In such case, rather than averaging the motion vectors, the pixels of macroblocks corresponding to the motion vectors are averaged to replace and recover the lost macroblock.

As discussed above, if available motion vectors or the average values of available motion vectors of macroblocks adjacent the lost macroblock are used as the estimated motion vector of the lost macroblock, the lost macroblock can be recovered to nearly the same image the original macroblock. Thus, an error concealment method of a motion video decompression system according to the present invention has the following advantages.

The motion vector estimation is controlled based upon the coding type of video frame with a lost macroblock and the position of the macroblock adjacent to a lost macroblock within an adjacent frame is selected by using the estimated motion vector of the lost macroblock, whereby the lost macroblock can be recovered nearly to as good a quality as the original macroblock. As a result, the error concealment method according to the present invention improves the visual quality of the received video and has excellent performance with respect to Peak Signal to Noise Ratio (PSNR) as compared to the conventional method.

Moreover, even during the motion vector estimation, the average value between the motion vectors of the top and bottom macroblocks of the lost macroblock or the average pixel values of macroblocks corresponding to the motion vectors is obtained by means of a simple and real-time operation. Therefore, the error concealment method according to the present invention can be easily applicable in a DTV, a HDTV and so forth without the big burden of hardware complexity.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An error concealment method of a motion video decompression system, comprising:

estimating motion information of lost video data within a current video frame; and restoring the lost video data from a video frame adjacent to a current video frame utilizing the estimated motion information.

2. The method of claim 1, wherein the step of estimating motion information comprises:
   determining a coding mode of the current video frame; and
   estimating motion information of the lost video data utilizing at least one motion vector of video data adjacent to the lost video data within the current video frame, based upon the coding mode of the current video frame.

3. An error concealment method of a motion video decompression system, comprising:
   determining a type of video frame containing a lost macroblock, wherein the determined type of video frame is a predictive frame;
   detecting whether motion information exists in a top macroblock and a bottom macroblock of the lost macroblock;
   estimating a motion vector of the lost macroblock by the motion information of the top or bottom macroblock, if motion information exists in only one of either the top or bottom macroblock; and
   searching a macroblock of a previous frame adjacent to the video frame using the estimated motion vector, and recovering the lost macroblock from the searched macroblock of the previous frame.

4. An error concealment method of a motion video decompression system, comprising:
   determining a type of video frame containing a lost macroblock, wherein the determined type of video frame is a predictive frame;
   detecting whether motion information exists in a top macroblock and a bottom macroblock of the lost macroblock;
   estimating a motion vector of the lost macroblock by an average value between the motion information of the top and bottom macroblocks, if motion information exists in both the top and bottom macroblock; and
   searching a macroblock of a previous frame adjacent to the video frame using the estimated motion vector, and recovering the lost macroblock from the searched macroblock of the previous frame.

5. An error concealment method of a motion video decompression system, comprising:
   determining a type of video frame containing a lost macroblock, wherein the determined type of video frame is a bidirectional predictive frame;
   detecting whether motion information exists in a top macroblock and a bottom macroblock of the lost macroblock;
   estimating a motion vector of the lost macroblock by an average value between motion information of the top and bottom macroblocks, if the motion information exists in both the top and bottom macroblock; and
   searching a macroblock of a previous frame adjacent to the video frame using the estimated motion vector, and recovering the lost macroblock from the searched macroblock of the previous frame.

6. The method of claim 5, wherein the motion vector is estimated by an average value between forward motion information of the top and bottom macroblocks, if the forward motion information exists in both the top and bottom macroblock.

7. The method of claim 5, wherein the motion vector is estimated by a average value between backward motion information of the top and bottom macroblocks, if the backward motion information exists in both the top and bottom macroblock and if one of either the top or bottom macroblock does not have forward motion information.

8. The method of claim 5, wherein the motion vector is estimated by an average value between a forward motion information and a backward motion information, if the top macroblock has only one of either the forward motion information or the backward motion information while the bottom macroblock has only the other motion information.

9. An error concealment method of a motion video decompression system, comprising:
   determining a type of video frame containing a lost macroblock, wherein the determined type of video frame is a bidirectional predictive frame;
   detecting whether motion information exists in a top macroblock and a bottom macroblock of the lost macroblock;
   estimating pixels of the lost macroblock by an average pixel value between pixels of macroblocks corresponding to the motion information of the top or bottom macroblocks, if motion information exists in both the top and bottom macroblock; and
   replacing the pixels of the lost macroblock with the average pixel value to recover the lost macroblock.

10. The method of claim 8, wherein the pixels of the lost macroblock are estimated by an average value between pixels of macroblocks corresponding to forward motion information of the top and bottom macroblocks, if the forward motion information exists in both the top and bottom macroblock.

11. The method of claim 8, wherein the pixels of the lost macroblock are estimated by an average value between pixels of macroblocks corresponding to backward motion information of the top and bottom macroblocks, if the backward motion information exists in both the top and bottom macroblock and if one of either the top or bottom macroblock does not have a forward motion information.

12. The method of claim 8, wherein the pixels of the lost macroblock are estimated by an average value between pixels of macroblocks corresponding to a forward motion information and backward motion information, if the top macroblock has only one of either the forward motion information or the backward motion information while the bottom macroblock has only the other motion information.

13. An error concealment method of a motion video decompression system, comprising:
   determining a type of video frame containing a lost macroblock, wherein the determined type of video frame is a bidirectional predictive frame;
   detecting whether motion information exists in a top macroblock and a bottom macroblock of the lost macroblock;
   estimating a motion vector of the lost macroblock by the motion information of the top or bottom macroblock, if motion information exists in only one of either the top or bottom macroblock; and
   searching a macroblock of a previous frame adjacent to the video frame using the estimated motion vector, and recovering the lost macroblock from the searched macroblock of the previous frame.

14. The method of claim 13, wherein the motion vector is estimated by an average value between forward motion information and backward motion information, if one of either the top or bottom macroblock has both the forward and backward motion information.

15. An error concealment method of a motion video decompression system, comprising:
   determining a type of video frame containing a lost macroblock, wherein the determined type of video frame is a bidirectional predictive frame;
   detecting whether motion information exists in a top macroblock and a bottom macroblock of the lost macroblock;
   estimating pixels of the lost macroblock by pixels of macroblocks corresponding to the motion information of the top or bottom macroblock, if motion information exists in only one of either the top or bottom macroblock; and
   replacing the pixels of the lost macroblock with the average pixel value to recover the lost macroblock.

16. An error concealment method of a motion video decompression system, comprising:
   determining a type of video frame containing a lost macroblock, wherein the determined type of video frame is a bidirectional predictive frame;
   detecting whether motion information exists in a top macroblock and a bottom macroblock of the lost macroblock;
   estimating motion information of lost video data within a current video frame; and
   recovering the information of the lost macroblock from the information of the macroblock positioned at the same location within the previous frame, if motion information does not exists in either the top or bottom macroblock.

17. An error concealment method of a motion video decompression system, comprising:
   determining a type of video frame containing a lost macroblock;
   estimating motion information of lost video data within a current video frame, wherein if one or more bidirectional predictive frame are within a Group of Picture, the motion information is estimated by assigning weights to forward motion information of a previous frame and to backward motion information of a subsequent frame, based upon the distance of the video frame from the previous frame and the subsequent frame; and
   recovering the information of the lost macroblock from the information of the macroblock positioned at the same location within the previous frame, if motion information does not exists in either the top or bottom macroblock.

18. The method of claim 17, wherein motion information of either the previous or subsequent frame whichever is closer to the video frame is given greater weight.

19. The method of claim 17, wherein if the video frame is equidistant to both the previous frame and the subsequent frame, the forward motion information is utilized.

20. The method of claim 17, wherein the lost macroblock is recovered by replacing the lost macroblock with the information from the macroblock of an adjacent video frame.

* * * * *